United States Patent [19]
Sapir

[11] 3,917,359
[45] Nov. 4, 1975

[54] ANTI-SKID BRAKE CONTROL SYSTEM AND FAILSAFE CIRCUIT THEREFOR
[75] Inventor: Said Sapir, Los Angeles, Calif.
[73] Assignee: International Telephone & Telegraph Corporation, New York, N.Y.
[22] Filed: Aug. 6, 1974
[21] Appl. No.: 495,227

[52] U.S. Cl. ............................ 303/21 AF; 340/52 B
[51] Int. Cl.² .......................................... B60T 8/00
[58] Field of Search .................... 303/7, 20, 21 AF; 307/10 R, 233 B, 235; 324/51; 340/52 B, 248 A, 253 B

[56] References Cited
UNITED STATES PATENTS
3,759,582  9/1973  Ohta et al. .................... 303/21 AF
3,825,307  7/1974  Carr et al. ..................... 303/21 AF
3,839,643  10/1974  Lefevre et al. ............... 307/233 B X
3,841,712  10/1974  Syria ............................. 303/21 AF Primary Examiner—Trygve M. Blix
Assistant Examiner—Stephen G. Kunin
Attorney, Agent, or Firm—A. Donald Stolzy

[57] ABSTRACT

An anti-skid brake control system and a failsafe circuit therefor wherein an open in either one of two wheel velocity pick-up coils is detected by comparing the sum of the coil currents with a constant current, and suppressing, in response thereto, a controller override of the manual operation. The controller is, thus, disabled when it should be, i.e., when its input from one or both of the coils is erroneous because of one or more opens therein.

12 Claims, 1 Drawing Figure

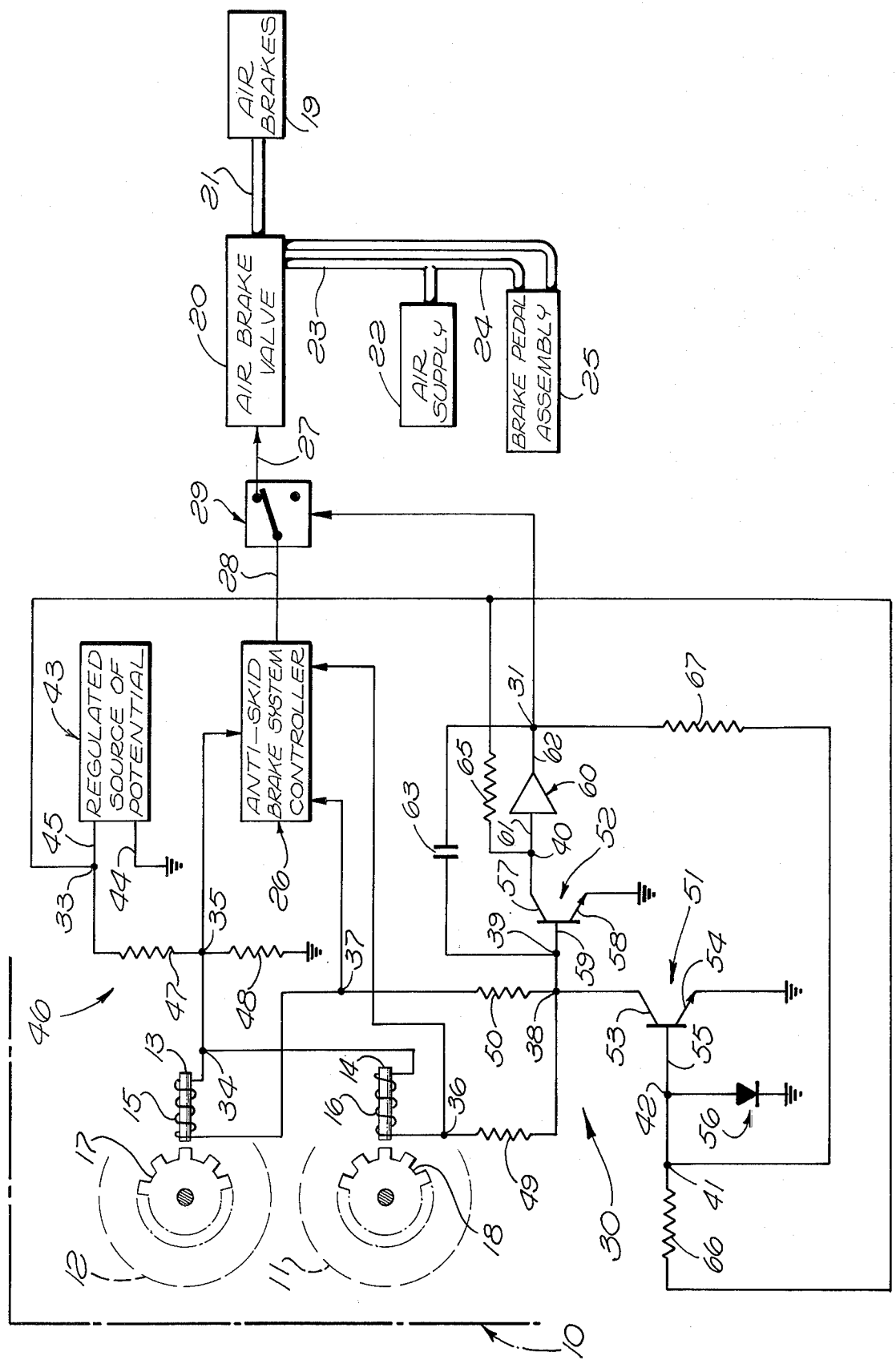

ANTI-SKID BRAKE CONTROL SYSTEM AND FAILSAFE CIRCUIT THEREFOR

BACKGROUND OF THE INVENTION

This invention relates to brake control systems, and more particularly, to a system for preventing skids, and a failsafe circuit therefor.

In the past, anti-skid brake control systems have suffered from malfunctions when opens developed in the coils of the wheel speed sensors.

SUMMARY OF THE INVENTION

In accordance with the present invention, the above-described and other disadvantages of the prior art are overcome by the use of an open circuit detector.

According to an outstanding feature of the present invention, the current through two velocity pick-ups is added together and compared with a constant current. When the sum falls below a minimum indicating an open in either one of the coils or in both of them, system controller output is cut off and the system returned to manual. This is a safety measure because it is not at all safe for the system to operate on erroneous data provided by a coil which has an open. Further, manual control is much preferred over defective automatic control.

The above-described and other advantages of the present invention will be better understood from the following detailed description when considered in connection with the accompanying drawings.

BRIEF DESCRIPTION OF THE DRAWINGS

In the drawings which are to be regarded as merely illustrative, the single FIGURE is a diagrammatic view of one embodiment of the present invention.

DESCRIPTION OF THE PREFERRED EMBODIMENT

In the drawing, a motor vehicle is illustrated at 10 having wheels 11 and 12. Permanent magnets 13 and 14 are fixed relative to the chassis, not shown. Permanent magnet 13 has a pick-up coil 15 wound therearound. Permanent magnet 14 has a pick-up coil 16 wound therearound. A toothed wheel 17 is fixed to wheel 12. A toothed wheel 18 is fixed to wheel 11.

The arrangement of permanent magnets 13 and 14, coils 15 and 16 and toothed wheels 17 and 18 is entirely conventional and is employed to produce output pulses of a pulse repetition frequency directly proportional to wheel speed. Pulses are produced across coil 15 at a frequency directly proportional to the speed of wheel 12. Pulses are produced across coil 16 of a frequency directly proportional to the speed of wheel 11.

The vehicle air brakes are illustrated at 19 connected from an air brake valve 20 via a conduit 21. An air supply 22 is connected via conduits 23 and 24 to valve 20 and a brake pedal assembly 25, respectively.

The air brakes 19 are operated, as is conventional, by depressing a brake pedal in assembly 25. This supplies air to valve 20. Valve 20, in turn, supplies air to the brakes 19.

It is also conventional to override the manual control which is achieved through the use of the brake pedal. This override comes in the form of an anti-skid brake system controller 26. Valve 20 has an electrical input lead 27 which is connected from an electrical output lead 28 of controller 26 through a switch 29. Switch 29 may be a relay or an electronic switch such as a transistor switch. The output of controller 26 is disabled under a coil open condition. In other words, switch 29 is opened by an output from a circuit 30 taken from a junction 31, the connection to switch 29 from junction 31 being over an input lead 32 to switch 29.

Various junctions are provided throughout circuit 30 including junctions 33, 34, 35, 36, 37, 38, 39, 40, 41 and 42.

Controller 26 is connected from junctions 35, 36 and 37. A regulated source of potential 43 is provided having one output lead grounded at 44, and another output lead 45 connected to junction 33. A voltage divider 46 is provided. A resistor 47 is connected between junctions 33 and 35, and a resistor 48 connected from junction 35 to ground.

Junctions 34 and 35 are connected together. Coil 15 is connected between junctions 34 and 37. Coil 16 is connected between junctions 34 and 36. A resistor 49 is connected between junctions 36 and 38. A resistor 50 is connected between junctions 37 and 38. Junctions 38 and 39 are connected together. Transistors of the NPN conductivity type are provided at 51 and 52. Transistor 51 has a collector 53 connected from junction 38, an emitter 54 connected to ground and a base 55 connected from junction 42.

Junctions 41 and 42 are connected together. A diode 56 is connected from junction 42 to ground and poled to be conductive in a direction toward ground.

Transistor 52 includes a collector 57 connected to junction 40, an emitter 58 which is connected to ground, and a base 59 which is connected from junction 39.

A non-inverting amplifier 60 is provided having an input lead 61 connected from junction 40 and an output lead 62 connected to junction 31. A capacitor 63 is connected between junctions 31 and 39. A junction 64 is connected from junction 33. A resistor 65 is connected between junctions 40 and 64. A resistor 66 is connected between junctions 41 and 64. A resistor 67 is connected from junction 31 to junction 41.

A number of component parts of the circuit 30 may be considered to be what is known as a Norton amplifier. The current supplied from junction 64 through resistor 66 determines the amount of collector current transistor 51 has. Diode 56, with the remainder of the circuit, makes the collector current of transistor 51 substantially the same as that which flows through resistor 66. This means that when the sum of the currents in resistors 49 and 50 fall below a predetermined minimum, the circuit 30 latches and opens switch 29, disabling controller 26.

Resistor 67 is a positive feedback resistor which enhances latching.

Capacitor 63 prevents latching due to the receipt of asynchronous pulses from coils 15 and 16. This can happen because, in conventional anti-skid brake control systems, each of the wheels 11 and 12 may rotate independently because of the use of a conventional differential or for any other reason.

Source 43, controller 26, valve 20, air supply 22, assembly 25, and brakes 19 all may be entirely conventional. The same is true of switch 29. As an example of the foregoing, air brake valve 20 may be that disclosed in copending application Ser. No. 359,653 filed May 14, 1973, by Roger Greenwood for COMBINATION VALVE, assigned to the assignee of this application. The entire contents of said copending application is, by this reference hereto, incorporated herein as though fully set forth herein hereat.

Switch 2a is an entirely conventional, self-locking relay or latching electronic or transistor switch which latches in the open position when actuated to that position by amplifier 60 and, upon removal of power and the subsequent reapplication thereof, moves the switch back to its unlatched position. For example, switch 29 is shown in its unlatched position.

The phrase "latching switch" is hereby defined for use in the claims to include either a self-locking relay or a latching electronic or transistor switch or other latching switch.

What is claimed is:

1. An anti-skid brake control system comprising: a land vehicle having first and second wheels; first and second electromagnetic pick-ups mounted on said vehicle for producing first and second series of pulses, respectively, at first and second respective pulse repetition frequencies directly proportional to the respective speeds of said first and second wheels, said first and second pick-ups including first and second inductive windings, respectively; an air brake valve; a brake pedal assembly; a supply of fluid under pressure connected to said valve and to said brake pedal assembly; a set of fluid pressure operable brakes connected from said valve, said valve being operable by fluid under pressure supplied in response to pressure on said brake pedal assembly, said valve having an electrical input lead, said valve being deactuable by predetermined electrical signals applied to said input lead thereto; an anti-skid brake system controller connected from both of said first and second windings to said valve input lead to supply signals to the latter on predetermined conditions to override the fluid pressure supplied to said brakes in response to pressure on said brake pedal assembly; and for override means connected from both of said windings for interrupting control of said valve by said controller when at least one of said windings develops an open, a regulated source of potential being provided having a first output lead connected to a point of reference potential, and a second output lead, said windings each having a first lead connected from the second output lead of said source, and a second lead, first and second transistors each having a collector, an emitter and a base, a first resistor connected from the second output lead of said source to said first transistor base, an amplifier having an input lead and an output lead, a second resistor connected from said amplifier input lead to the second output lead of said source, a third resistor connected from said amplifier output lead to said first transistor base, a diode connected from said first transistor base to said point of reference potential, both of said emitters being connected to said point of reference potential, a fourth resistor connected from the second lead of said first winding to said second transistor base, a fifth resistor connected from the second lead of said second winding to said second transistor base, a capacitor connected from said amplifier output lead to said second transistor base, said amplifier means output signals being produced on said amplifier output lead, said first transistor collector being connected from said second transistor base, said second transistor collector being connected to said amplifier input lead, and control means connected from said amplifier output lead to suppress the output of said controller and the input to said valve which would otherwise be impressed on said valve input lead by said controller, said control means being actuable to suppress said controller output and said valve input when either one of said windings develop an open either one at a time or both together.

2. The invention as defined in claim 1, wherein said override means includes a switch.

3. The invention as defined in claim 2, wherein said switch latches open when actuated by said detector to disable the output of said controller.

4. The invention as defined in claim 3, wherein said switch unlatches closed when power is removed therefrom and reapplied thereto and removed from and reapplied to said circuits, said detector and said controller.

5. The invention as defined in claim 1, wherein both of said transistors are of the NPN conductivity type, said diode being poled to be conductive in a direction toward said point of reference potential.

6. The invention as defined in claim 5, wherein said override means includes a switch.

7. The invention as defined in claim 6, wherein said switch latches open when actuated by said detector to disable the output of said controller.

8. The invention as defined in claim 7, wherein said switch unlatches closed when power is removed therefrom and reapplied thereto and removed from and reapplied to said circuits, said detector and said controller.

9. The invention as defined in claim 5, wherein a voltage divider is provided including sixth and seventh resistors of equal resistance connected in the order stated from said source second output lead to said point of reference potential, said sixth and seventh resistors being joined together at a tap connected from both of said winding first leads to said controller.

10. The invention as defined in claim 9, wherein said override means includes a switch.

11. The invention as defined in claim 10, wherein said switch latches open when actuated by said detector to disable the output of said controller.

12. The invention as defined in claim 11, wherein said switch unlatches closed when power is removed therefrom and reapplied thereto and removed from and reapplied to said circuits, said detector and said controller.

* * * * *